US012689093B2

(12) United States Patent
Lee et al.

(10) Patent No.: US 12,689,093 B2
(45) Date of Patent: Jul. 21, 2026

(54) COPOLYMER FOR SEPARATOR, AND SECONDARY BATTERY COMPRISING SAME

(71) Applicant: HANSOL CHEMICAL CO., LTD, Seoul (KR)

(72) Inventors: Go-Eun Lee, Wanju-gun (KR); Bo-Ok Jang, Wanju-gun (KR); Jin-Yeong Kim, Wanju-gun (KR); Seung-Heon Kim, Wanju-gun (KR); Jun Park, Wanju-gun (KR); Sae-Wook Oh, Wanju-gun (KR); Se-Man Kwon, Wanju-gun (KR)

(73) Assignee: HANSOL CHEMICAL CO., LTD., Seoul (KR)

( * ) Notice: Subject to any disclaimer, the term of this patent is extended or adjusted under 35 U.S.C. 154(b) by 567 days.

(21) Appl. No.: 18/255,338

(22) PCT Filed: Oct. 29, 2021

(86) PCT No.: PCT/KR2021/015438
§ 371 (c)(1),
(2) Date: May 31, 2023

(87) PCT Pub. No.: WO2023/074967
PCT Pub. Date: May 4, 2023

(65) Prior Publication Data

US 2024/0030550 A1 Jan. 25, 2024

(30) Foreign Application Priority Data

Oct. 25, 2021 (KR) ........................ 10-2021-0142451

(51) Int. Cl.

| | |
|---|---|
| ***H01M 50/42*** | (2021.01) |
| ***C08F 220/56*** | (2006.01) |
| ***C08K 3/22*** | (2006.01) |
| ***H01M 50/423*** | (2021.01) |
| ***H01M 50/446*** | (2021.01) |

(52) U.S. Cl.
CPC ........... *H01M 50/42* (2021.01); *C08F 220/56* (2013.01); *C08K 3/22* (2013.01); *H01M 50/423* (2021.01); *H01M 50/446* (2021.01); *C08F 2800/20* (2013.01); *C08K 2003/2227* (2013.01)

(58) Field of Classification Search
None
See application file for complete search history.

(56) References Cited

U.S. PATENT DOCUMENTS 4,358,355 A * 11/1982 Kalu ..................... C08F 220/56
522/120

FOREIGN PATENT DOCUMENTS

| | | |
|---|---|---|
| JP | 2004031166 | 1/2004 |
| JP | 2007522615 | 8/2007 |
| JP | 2015022956 | 2/2015 |
| JP | 2015118908 | 6/2015 |
| JP | 2019057488 | 4/2019 |
| JP | 2019510364 | 4/2019 |
| JP | 2021054075 | 4/2021 |
| KR | 20060072065 | 6/2006 |
| KR | 101430975 | 8/2014 |
| KR | 20160033692 | 3/2016 |
| KR | 20190062924 | 6/2019 |
| KR | 102084099 | 3/2020 |
| KR | 20200130134 | 11/2020 |
| KR | 20200140637 | 12/2020 |

* cited by examiner

*Primary Examiner* — Carlos Barcena
(74) *Attorney, Agent, or Firm* — Brooks, Cameron & Huebsch, PLLC

(57) ABSTRACT

The present disclosure relates to a copolymer, which contains: an acrylonitrile-based monomer unit in an amount in a range of greater than 0 wt % and 15 wt % or less; a hydroxyl group (—OH)-containing acrylate-based monomer unit in an amount in a range of greater than 0 wt % and 5 wt % or less; an acrylamide-based monomer unit in an amount in a range of greater than 80 wt % and less than 95 wt %; and an acrylic acid-based monomer unit in an amount in a range of greater than 0 wt % and 15 wt % or less, based on the total weight of the copolymer in an amount of 100 wt %, to a slurry composition containing the copolymer, to a separator, and to a secondary battery.

8 Claims, No Drawings

COPOLYMER FOR SEPARATOR, AND SECONDARY BATTERY COMPRISING SAME

TECHNICAL FIELD

The present disclosure relates to a copolymer, a slurry composition containing the copolymer, a separator, and a secondary battery.

BACKGROUND ART

With high energy density, lithium secondary batteries are being used extensively in electrical, electronic, telecommunication, and computer industries. In addition, application fields of lithium secondary batteries are being expanded to high-capacity secondary batteries for hybrid vehicles, electric vehicles, and the like, in addition to small lithium secondary batteries for portable electronic devices.

Although the insulation of lithium-ion secondary batteries is enabled by separators, internal or external battery abnormalities or shocks cause a short circuit between positive and negative electrodes, which may lead to heat generation and explosion. Thus, ensuring the thermal and chemical safety of the separator is extremely important.

Currently, polyolefin-based films are being used widely as separators, but polyolefins have the disadvantages of severe heat shrinkage at high temperatures and poor mechanical properties.

To improve the stability of such polyolefin-based separators, a porous separator in which a polyolefin porous substrate film is coated with a mixture of inorganic particles and a binder has been developed.

That is, to suppress battery instability due to dendrite and heat shrinkage caused by the high temperature of the polyolefin-based separator, one side or both sides of the porous separator substrate are coated with the inorganic particles also in addition to the binder. As a result, the inorganic particles can provide the function of suppressing the shrinkage rate of the substrate. In addition, a further safe separator can be manufactured by the coating layer.

In order to obtain excellent battery characteristics, the coating layer is required to be evenly coated as well as to have strong adhesive strength to the substrate.

In addition, to cope with the recent high-capacity and high-output of the battery, the heat resistance of existing separators needs to be further improved.

DOCUMENTS OF RELATED ART

Patent Document (Patent Document 1) Korean Patent No. 10-1430975
(Patent Document 2) Korean Patent Application Publication No. 10-2006-0072065

DISCLOSURE

Technical Problem

Hence, the present disclosure aims to provide a slurry composition having excellent heat resistance or adhesiveness using a copolymer.

In addition, the present disclosure aims to provide a separator having excellent heat resistance with the application of the slurry composition and a battery having excellent performance with the use of the separator.

Accordingly, a battery having excellent battery resistance and stability can be implemented.

However, the problems to be solved by the present disclosure are not limited to the above description, and other problems can be clearly understood by those skilled in the art from the following description.

Technical Solution

In one aspect of the present disclosure, a copolymer containing: an acrylonitrile-based monomer unit in an amount in a range of greater than 0 wt % and 15 wt % or less; a hydroxyl group (—OH)-containing acrylate-based monomer unit in an amount in a range of greater than 0 wt % and 5 wt % or less; an acrylamide-based monomer unit in an amount in a range of greater than 80 wt % and less than 95 wt %; and an acrylic acid-based monomer unit in an amount in a range of greater than 0 wt % and 15 wt % or less, based on the total weight of the copolymer in an amount of 100 wt %, is provided In another aspect of the present disclosure, a slurry composition containing the copolymer and inorganic particles is provided.

In a further aspect of the present disclosure, a separator containing the slurry composition is provided.

In yet a further aspect of the present disclosure, a secondary battery including the separator is provided.

Advantageous Effects

A copolymer of the present disclosure can improve the dispersion stability of a slurry composition, increase the adhesive strength to a polyolefin film, which is a separator substrate, and improve the heat resistance of a separator.

In addition, a battery having excellent battery resistance and stability can be implemented.

BEST MODE

Hereinafter, the action and effect of the present disclosure will be described in further detail through specific embodiments of the disclosure. However, these embodiments are provided only for illustrative purposes, and the scope of the present disclosure is not limited thereto.

All terms including technical and scientific terms used herein have the same meaning as commonly understood by those skilled in the art to which the present disclosure belongs. It will be further understood that terms defined in commonly used dictionaries should be interpreted as having a meaning that is consistent with their meaning in the context of the relevant art and the present disclosure and will not be interpreted in an idealized or overly formal sense unless expressly so defined herein.

Therefore, the configuration of embodiments described herein are merely examples and do not exhaustively present the technical spirit of the present disclosure. Accordingly, it should be appreciated that there may be various equivalents and modifications that can replace the embodiments and the configurations at the time at which the present disclosure is filed.

As used herein, the singular forms are intended to include the plural forms as well, unless the context clearly indicates otherwise. It will be further understood that the terms "comprise", "include", "have", etc., when used herein, specify the presence of stated features, integers, steps, components, or combinations thereof but do not preclude the presence or addition of one or more other features, integers, steps, components, or combinations thereof.

As used herein to represent a specific numerical range, the expression "a to b" means "≥a and ≤b".

One aspect of the present disclosure may include: an acrylonitrile-based monomer unit in an amount in a range of greater than 0 wt % and 15 wt % or less; a hydroxyl group (—OH)-containing acrylate-based monomer unit in an amount in a range of greater than 0 wt % and 5 wt % or less; an acrylamide-based monomer unit in an amount in a range of greater than 80 wt % and less than 95 wt %; and an acrylic acid-based monomer unit in an amount in a range of greater than 0 wt % and 15 wt % or less, based on the total weight of a copolymer in an amount of 100 wt %.

The acrylonitrile-based monomer may be, for example, at least one selected from the group consisting of acrylonitrile and methacrylonitrile, but is not limited thereto.

The hydroxyl group (—OH)-containing acrylate-based monomer may be, for example, at least one selected from the group consisting of hydroxyl methyl acrylate, hydroxyl methyl methacrylate, hydroxyl ethyl acrylate, hydroxyl ethyl methacrylate, hydroxyl propyl acrylate, hydroxyl propyl methacrylate, hydroxyl isopropyl acrylate, hydroxyl isopropyl methacrylate, hydroxyl butyl acrylate, hydroxyl butyl methacrylate, hydroxyl sec-butyl acrylate, hydroxyl sec-butyl methacrylate, hydroxyl tert-butyl acrylate, hydroxyl tert-butyl methacrylate, and polyethylene glycol methacrylate, but is not limited thereto.

The acrylamide-based monomer unit may be, for example, at least one selected from the group consisting of acrylamide, methacrylamide, N-ethyl acrylamide, N-ethyl methacrylamide, N-propyl acrylamide, N-isopropyl acrylamide, N-isopropyl methacrylamide, N-butyl acrylamide, N-butyl methacrylamide, N-sec-butyl acrylamide, N-sec-butyl methacrylamide, N-tert-butyl acrylamide, and N-tert-butyl methacrylamide, but is not limited thereto.

The acrylic acid-based monomer unit may be, for example, at least one selected from the group consisting of acrylic acid and methacrylic acid, but is not limited thereto.

When including both the hydroxyl group-containing acrylate-based monomer and the acrylic acid-based monomer simultaneously, heat resistance may be improved.

This is because a cross-linked structure is formed through a condensation reaction between a hydroxyl group and a carboxylic acid group of these monomers.

Therefore, provided that the amount of the carboxylic acid group is fixed, when the amount of the hydroxyl group-containing acrylate-based monomer increases, the degree of cross-linking may increase, and heat resistance thus may be improved. When the amount of the hydroxyl group-containing acrylate-based monomer exceeds 5 wt %, the viscosity may be extremely high, causing a problem in coating workability.

In addition, the higher the amount of the acrylamide-based monomer and the lower the amount of the acrylic acid-based monomer, the better the heat resistance. However, electrical resistance may become excessively high.

On the contrary, the lower the amount of the acrylamide-based monomer and the higher the amount of the acrylic acid-based monomer, the lower the electrical resistance. However, heat resistance may decrease.

This is because the effect of improving the ionic conductivity of the carboxyl group in the acrylic acid-based monomer affects electrical resistance, and the acrylamide-based monomer having a high glass transition temperature affects heat resistance.

Therefore, when the amounts of the acrylic acid-based monomer and the acrylamide-based monomer exceed or fall below the amount range of the present disclosure, problems regarding electrical resistance and heat resistance may occur.

A cyano group of the acrylonitrile-based monomer may improve adhesive strength and heat resistance. In addition, the high ionic conductivity of the cyano group may lower electrical resistance.

However, when the amount of the acrylonitrile-based monomer exceeds or falls below the amount range of the present disclosure, the extent of improvement in adhesive strength and heat resistance may be greatly reduced, thereby decreasing both adhesive strength and heat resistance.

In one embodiment, the copolymer may be represented by Formula 1 below.

[Formula 1]

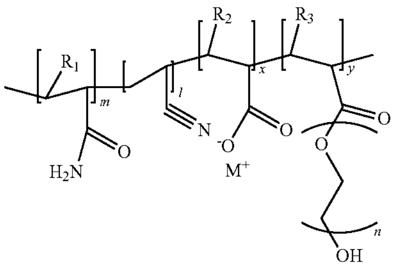

In Formula 1 above, $R_1$ to $R_3$ are each independently hydrogen, or a straight-chain or branched-chain hydrocarbon having 1 to 4 carbon atoms, M is at least one selected from the group consisting of an alkali metal, a secondary amine, and a tertiary amine, n is an integer in a range of 0 to 500, and m, 1, x, and y satisfy m+n+x+y=1.

In Formula 1 above, m, 1, x, and y correspond to the mole fractions of the respective monomer units, and the sum of the mole fractions of the respective monomer units is 1.

In one embodiment, $R_1$ to $R_3$ in Formula 1 above may each independently include at least one selected from the group consisting of hydrogen, methyl, and ethyl.

On the other hand, when M in Formula 1 above is the alkali metal, M may be Li, Na, or K, but is not limited thereto.

When M in Formula 1 above is one selected from the group consisting of secondary amines and tertiary amines, M may be contained in an amount in a range of 0.05 parts to 0.4 parts by weight with respect to the copolymer in an amount of 100 parts by weight.

In one embodiment, M in Formula 1 above may include at least one selected from the group consisting of compounds represented by Formulas 2 to 5 below.

[Formula 2]

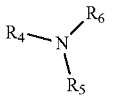

-continued

[Formula 3]

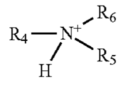

In Formulas 2 and 3 above, $R_4$ to $R_6$ are each independently a straight-chain or branched-chain hydrocarbon having 1 to 6 carbon atoms.

[Formula 4]

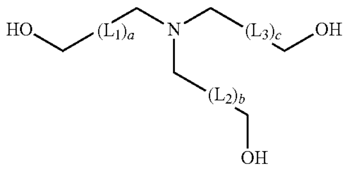

[Formula 5]

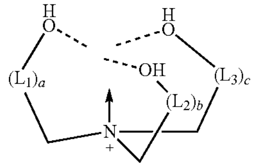

In Formulas 4 and 5 above, $L_1$ to $L_3$ are each independently an alkylene group having 1 to 6 carbon atoms, and a to c are each independently an integer in a range of 0 to 2.

In one embodiment, the copolymer may be a random or block copolymer depending on a synthesis process.

In one embodiment, the copolymer may have a number average molecular weight in a range of 5,000 to 1,000,000.

When the number average molecular weight of the copolymer is less than 5,000, the fluidity of the copolymer may increase, resulting in decreases in the dispersibility as well heat resistance of the separator. When the number average molecular weight is 1,000,000 or more, the viscosity is excessively high for use, and the pores of the separator may be blocked, thereby reducing air permeability and resistance.

A slurry composition, according to another aspect of the present disclosure, may include the copolymer described above and inorganic particles.

The slurry composition may have an adhesive strength in a range of 80 gf/mm to 86 gf/mm.

The inorganic particles may be used without limitation as long as the particles are insulator particles, and are preferably high dielectric constant insulator particles.

Specific examples of the inorganic particles may include $Al_2O_3$, AlOOH, $TiO_2$, $ZrO_2$, ZnO, NiO, CaO, $SnO_2$, $Y_2O_3$, MgO, $BaTiO_3$, $CaTiO_3$, $SrTiO_3$, SiC, $Li_3PO_4$, $Pb(Zr,Ti)O_3$ (PZT), $(Pb,La)(Zr,Ti)O_3$(PLZT), and mixtures thereof.

The inorganic particles are not particularly limited in size, but may have, for example, an average particle diameter in a range of 0.01 μm to 30 μm, more preferably, in the range of 0.1 μm to 10 μm. When the average particle diameter of the inorganic particles is less than the above preferable range, dispersibility may be lowered. When the average particle diameter exceeds the above preferable range, the thickness of the coating layer may become large after coating, and mechanical properties thus may deteriorate.

In addition, the inorganic particles are not particularly limited in form and may have, for example, a spherical, elliptical, or irregular form.

A separator, according to a further aspect of the present disclosure, may include the slurry composition.

The separator may have an electrical resistance in a range of 0.7 mΩ to 0.76 mΩ.

In addition, the separator may have a thermal contraction rate of 5% or less in both machine direction (MD, longitudinal direction) and transverse direction (TD, width direction).

The separator may be manufactured by coating at least one surface of a porous substrate film with the slurry composition described above, or by forming the slurry composition into a film form and laminating the film form to the porous substrate film.

On the other hand, the separator may be used as a separator for a secondary battery, for example, a separator for a lithium secondary battery.

One example of separator manufacturing may include: (a) preparing a polymer solution by dissolving or dispersing the copolymer in a solvent; (b) adding and mixing the inorganic particles to the polymer solution of (a) to obtain a mixture; and (c) coating and drying at least one region selected from the group consisting of the surface of a polyolefin-based separator substrate and a portion of pores in the substrate with the mixture of (b).

First, 1) the copolymer is formed and prepared in the form of the polymer solution in which the copolymer is dissolved or dispersed in the appropriate solvent.

The solvent preferably has a solubility index not inferior to that of the copolymer, used as a binder, and has a low boiling point. This is to facilitate uniform mixing and subsequent solvent removal. Non-limiting examples of the available solvents may include acetone, tetrahydrofuran, methylene chloride, chloroform, dimethylformamide, N-methyl-2-pyrrolidone (NMP), cyclohexane, water, or mixtures thereof. More preferably, the solvent may be used in a water-dispersed state.

2) The mixture of the inorganic particles and the polymer is prepared by adding and dispersing the inorganic particles to the prepared polymer solution.

A process of dispersing the polymer solution and the inorganic particles is preferably performed. In this case, the dispersion may appropriately take 1 hour to 50 hours. An existing method may be used as a dispersion method, and particularly, a ball milling method is preferable.

The mixture composed of the inorganic particles and the polymer is not particularly limited in composition. However, according to the composition of the mixture, the thickness, pore size, and porosity of the finally manufactured organic/inorganic composite porous separator of the present disclosure may be controlled.

That is, the higher the ratio of the inorganic particles (I) to the polymer (P) (ratio=I/P), the higher the porosity of the separator, resulting in an increase in the thickness of the separator under the same amount of non-volatile phase (inorganic particle weight+polymer weight). In addition, pores are likely to be formed between the inorganic particles, leading to an increase in pore size. In this case, the larger the size (particle diameter) of the inorganic particles, the larger the interstitial distance between the inorganic particles, resulting in an increase in the pore size.

3) The prepared polyolefin-based separator substrate was coated with prepared mixture of the inorganic particles and the polymer and then dried so that the separator of the present disclosure can be obtained.

In this case, an existing coating method known in the art may be used as a method of coating the prepared polyolefin-based separator substrate with the mixture of the inorganic particles and the polymer. For example, various methods, such as dip coating, die coating, roll coating, comma coating, or combinations of these methods, may be used. In addition, when coating the polyolefin-based separator substrate with the mixture of the inorganic particles and the polymer, the coating may be performed on both sides of the separator substrate or selectively performed on only one side.

When the separator is used in a secondary battery, lithium ions can be transferred not only through the separator substrate but also through a porous active layer. In addition, when an external impact causes an internal short circuit, the safety improvement effect described above may be exhibited.

In addition, the secondary battery may include a positive electrode, a negative electrode, the separator interposed between the positive and negative electrodes, and an electrolyte.

The secondary battery may be manufactured by existing methods known in the art. For example, the secondary battery is manufactured by interposing the separator between the electrodes to obtain an assembly and then injecting the electrolyte into the assembly.

The electrodes to be used with the separator are not particularly limited. However, typical positive electrode active materials available for positive electrodes of secondary batteries may be used as a positive electrode active material. Non-limiting examples thereof may include lithium intercalation material, such as lithium manganese oxide (lithiated magnesium oxide), lithium cobalt oxide (lithiated cobalt oxide), a lithium nickel oxide (lithiated nickel oxide), or a composite oxide formed by combinations thereof. In addition, typical negative electrode active materials available for negative electrodes of existing electrochemical devices may be used as a negative electrode active material. Non-limiting examples thereof may include lithium intercalation material, such as lithium metal, lithium alloy, carbon, petroleum coke, activated carbon, graphite, or other carbons materials. Both the electrodes are configured in forms in which the respective electrode active materials, described above, are bound to a positive electrode current collector, that is, a foil made of aluminum, nickel, or combinations thereof, and a negative electrode current collector, that is, a foil made of copper, gold, nickel, copper alloys, or combinations thereof.

The electrolyte preferably has a form in which a salt having a structure such as $A^+B^-$, where $A^+$ includes an alkali metal cation such as $Li^+$, $Na^+$, and $K^+$, or an ion composed of combinations thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, or an ion composed of combinations thereof, is dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), or a mixture thereof.

As a process of applying the separator to the battery, lamination and folding processes of the separator and the electrode may be performed in addition to a typical winding process.

MODE FOR INVENTION

Hereinafter, the present disclosure will be described in further detail using examples, but the present disclosure is not limited thereto.

[Preparation Example 1] Preparation of Copolymer

Distilled water in an amount of 650 parts by weight and a monomer mixture in an amount of 100 parts by weight were put into a reaction vessel, and then heated to a temperature of 60° C. and stirred while injecting high-purity nitrogen gas. The monomer mixture and potassium persulfate, a degradable initiator, in an amount in a range of 0.1 parts to 0.5 parts by weight with respect to the monomer mixture in an amount of 100 parts by weight, were each independently added to the reaction vessel prepared at a temperature of 60° C. Continuous polymerization reactions were performed to prepare a copolymer.

An aqueous solution of metal hydroxides (NaOH, LiOH, and KOH) was added to the prepared copolymer. Then, an amine-based organic compound in an amount in a range of 0.05 parts to 0.5 parts by weight, with respect to the copolymer of 100 parts by weight, was added and reacted to prepare a binder copolymer.

[Preparation Example 2] Preparation of Slurry for Porous Film Coating

Inorganic particles (alumina having an average particle diameter of 0.5 μm) and the binder copolymer prepared in Preparation Example 1 were mixed to have a non-volatile phase weight ratio of 96:4. Then, distilled water was added and mixed to have a non-volatile phase concentration of 35%. The resulting mixture was sufficiently dispersed using a ball milling method or a mechanical stirrer to prepare a slurry.

[Preparation Example 3] Preparation of Separator

A polyolefin porous substrate (polyethylene (PE), polypropylene (PP), and the like) was coated with the slurry for porous film coating prepared in Preparation Example 2 to form an inorganic coating layer. Various methods, such as dip coating, die coating, gravure coating, comma coating, and the like, were able to be used as a coating method.

In addition, after coating, warm air drying, hot air drying, vacuum drying, infrared drying, and the like, were used for drying, in which the drying was performed at a temperature in a range of 50° C. to 85° C.

The inorganic coating layer was formed on one side or both sides in a thickness in a range of 0.5 μm to 6 μm. When the thickness was smaller than 0.5 μm, there was a problem in that the heat resistance of the separator significantly decreased. When the thickness exceeded 6 μm, the separator had an excessively large thickness, resulting in a decrease in battery energy density and an increase in battery resistance.

Examples 1 to 3 and Comparative Examples 1 to 5

Examples 1 to 3 and Comparative Examples 1 to 5 were prepared according to Preparation Example 1 by adjusting the composition ratio of monomers and the amount of an amine-based organic compound as shown in Table 1.

The monomers used herein were as follows: acrylamide (AM) as an acrylamide-based monomer, acrylonitrile (AN) as an acrylonitrile-based monomer, acrylic acid (AA) as an acrylic acid-based monomer unit, and polyethylene glycol methacrylate (PEGMA) or hydroxyethyl methacrylate (HEMA) as a hydroxyl group (—OH)-containing acrylate-based monomer unit.

In addition, the amine-based organic compound used herein was triethanolamine (TA), which was added in an amount of 0.2 parts by weight with respect to the copolymer in an amount of 100 parts by weight.

Using the binder copolymers prepared by Examples 1 to 3 and Comparative Examples 1 to 5, slurries and separators for porous film coating were prepared according to Preparation Examples 2 and 3, respectively.

TABLE 1

| | Monomer composition (wt %) | | | | |
|---|---|---|---|---|---|
| Classification | AM | AA | AN | PEGMA | HEMA |
| Example 1 | 88 | 5 | 5 | 2 | 0 |
| Example 2 | 85 | 5 | 5 | 5 | 0 |
| Example 3 | 85 | 5 | 5 | 0 | 5 |
| Comparative Example 1 | 100 | 0 | 0 | 0 | 0 |
| Comparative Example 2 | 75 | 25 | 0 | 0 | 0 |
| Comparative Example 3 | 90 | 10 | 0 | 0 | 0 |
| Comparative Example 4 | 90 | 5 | 5 | 0 | 0 |
| Comparative Example 5 | 85 | 5 | 10 | 0 | 0 |

[Evaluation Example 1] Adhesive Strength of Slurry for Porous Film Coating

Each of the separators prepared according to Preparation Example 3 using the binder copolymers of Examples 1 to 3 and Comparative Examples 1 to 5 was cut into a size having a width of 18 mm and a length of 100 mm to prepare specimens.

A double-sided tape with an area having a width of 20 mm and a length of 40 mm was attached to an acrylic plate with an area having a width of 40 mm and a length of 100 mm. The prepared separator was attached onto the double-sided tape and then lightly pressed 5 times with a hand roller. The specimen prepared above was mounted in UTM (20 kgf load cell) so that one part of the separator was fixed to the upper clip of the tensile strength machine, and the tape attached to one side of the separator was fixed to the lower clip to measure 180° peel strength at a speed of 100 mm/min. Five or more specimens per sample were prepared and measured, and the average value was calculated.

[Evaluation Example 2] Heat Shrinkage Rate of Separator

Each of the separators prepared according to Preparation Example 3 using the binder copolymers of Examples 1 to 3 and Comparative Examples 1 to 5 was cut into specimens having a width of 5 cm and a length of 5 cm. The specimens were left in an oven at 150° C. for 1 hour to measure the shrinkage rate.

[Evaluation Example 3] Electrical Resistance of Separator

Each of the separators prepared according to Preparation Example 3 using the binder copolymers of Examples 1 to 3 and Comparative Examples 1 to 5, a lithium metal, and a SUS plate were each independently interposed to prepare a coin-cell type electrode assembly.

An electrolyte containing a lithium salt was injected into the prepared electrode assembly, and the electrode assembly was sealed to manufacture a lithium secondary battery.

An impedance analyzer was used to measure the impedance of the manufactured battery. The results thereof are shown in Table 2 below.

The evaluation results of Evaluation Examples 1 to 3 are shown in Table 2 below.

TABLE 2

| | Physical properties | | |
|---|---|---|---|
| Classification | Resistance [mΩ] | Adhesive strength [gf/mm] | Heat shrinkage rate (MD/TD) [%] |
| Example 1 | 0.76 | 84 | 4/4.5 |
| Example 2 | 0.72 | 83 | 3.5/4 |
| Example 3 | 0.7 | 85 | 3/3.5 |
| Comparative Example 1 | 0.87 | 6 | 3/3.5 |
| Comparative Example 2 | 0.67 | 8 | 26/38 |
| Comparative Example 3 | 0.77 | 7 | 7/8 |
| Comparative Example 4 | 0.78 | 87 | 6/6 |
| Comparative Example 5 | 0.76 | 78 | 6/6.5 |

Through Examples 1 and 2, it was confirmed that the higher the amount of the hydroxyl group-containing monomer, the lower the heat shrinkage rate, thereby improving the heat resistance of the separator.

In addition, in the case of Example 3 in which the same amount of HEMA having a much shorter chain was used instead of PEGMA as in Example 2, it was confirmed that the cross-linking density increased, so the heat resistance of the separator was further improved.

In the case of Comparative Examples 1 to 3 using the copolymers prepared using only acrylamide and acrylic acid as the monomers, the higher the amount of the acrylamide-based and the lower the amount of the acrylic acid, the better the heat resistance of the separator. However, it was confirmed that the electrical resistance of the separator increased.

In the case of using the copolymers of Comparative Examples 1 to 3, it was confirmed that the adhesive strength was greatly reduced compared to the case of using the copolymers of Examples 1 to 3. In particular, in the case of using the copolymers of Comparative Examples 2 and 3, it was confirmed that the heat shrinkage rate of the separator was increased, so the heat resistance of the separator decreased.

When comparing Comparative Example 4 using the copolymer prepared using only acrylamide, acrylonitrile, and acrylic acid as the monomers with Examples 1 to 3 in which a portion of acrylamide was modified with the hydroxyl group-containing monomer while containing the same amounts of acrylonitrile and acrylic acid, it was confirmed that the electrical resistance of the separator increased. In addition, it was confirmed that the heat shrinkage rate of the separator increased, so the heat resistance of the separator decreased.

When comparing Comparative Example 5 using the copolymer prepared using only acrylamide, acrylonitrile, and acrylic acid as the monomers with Examples 2 and 3 in which a portion of acrylonitrile was modified with the hydroxyl group-containing monomer while containing the same amounts of acrylamide and acrylic acid, it was confirmed that the electrical resistance of the separator increased, resulting in decreases in the adhesive strength and the heat resistance of the separator.

As a result, the separator prepared using the binder copolymers of Examples had excellent adhesive strength to the substrate and excellent heat resistance within 5% at a temperature of 150° C.

In addition, it is confirmed that battery resistance is excellent, so separator characteristics advantageous to high-capacity and rapid charging can be realized.

The scope of the present disclosure is defined by the appended claims rather than the detailed description presented above. All changes or modifications derived from the meaning and scope of the claims and the concept of equivalents should be construed to fall within the scope of the present disclosure.

INDUSTRIAL APPLICABILITY

A copolymer of the present disclosure can improve the dispersion stability of a slurry composition, increase the adhesive strength to a polyolefin film, which is a separator substrate, and improve the heat resistance of a separator.

In addition, a battery having excellent battery resistance and stability can be implemented.

The invention claimed is:

1. A copolymer comprising:

an acrylonitrile-based monomer unit in an amount in a range of greater than 0 wt % and 15 wt % or less;

a hydroxyl group (—OH)-containing acrylate-based monomer unit in an amount in a range of greater than 0 wt % and 5 wt % or less;

an acrylamide-based monomer unit in an amount in a range of greater than 80 wt % and less than 95 wt %; and an acrylic acid-based monomer unit in an amount in a range of greater than 0 wt % and 15 wt % or less, based on the total weight of the copolymer in an amount of 100 wt % %, wherein an alkali metal is bound to a carboxylate group of at least one acrylic acid-based monomer unit, wherein a secondary amine, a tertiary amine, or a combination thereof is bound to a carboxylate group of at least one acrylic acid-based monomer unit.

2. The copolymer of claim 1, wherein the copolymer is represented by Formula 1,

[Formula 1]

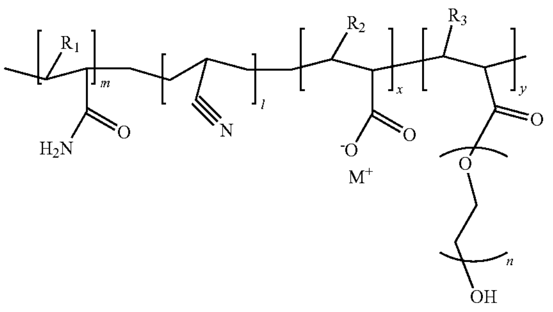

wherein in Formula 1, $R_1$ to $R_3$ are each independently hydrogen, or a straight-chain or branched-chain hydrocarbon having 1 to 4 carbon atoms, M comprises an alkali metal and at least one selected from the group consisting of a secondary amine and a tertiary amine, n is an integer in a range of 0 to 500, and m, l, x, and y satisfy m+l+x+y=1.

3. The copolymer of claim 2, wherein $R_1$ to $R_3$ in Formula 1 each independently comprise at least one selected from the group consisting of hydrogen, methyl, and ethyl.

4. The copolymer of claim 2, wherein M in Formula 1 comprises at least one selected from the group consisting of compounds represented by Formulas 2 to 5,

[Formula 2]

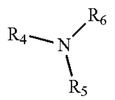

[Formula 3]

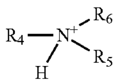

wherein in Formulas 2 and 3, $R_4$ to $R_6$ are each independently a straight-chain or branched-chain hydrocarbon having 1 to 6 carbon atoms, and

[Formula 4]

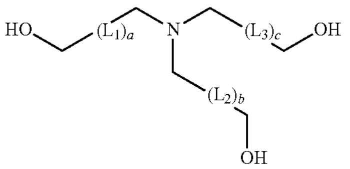

[Formula 5]

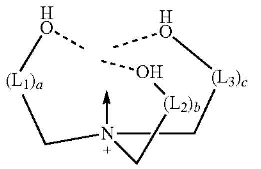

wherein Formulas 4 and 5, $L_1$ to $L_3$ are each independently an alkylene group having 1 to 6 carbon atoms, and a to c are each independently an integer in a range of 0 to 2.

5. The copolymer of claim 1, wherein the copolymer is a random or block copolymer.

6. The copolymer of claim 1, wherein the copolymer has a number average molecular weight in a range of 5,000 to 1,000,000.

7. A slurry composition comprising:

the copolymer of claim 1; and inorganic particles.

8. A separator comprising the slurry composition of claim 7.

* * * * *